J. W. TURK.
MACHINE FOR SEPARATING GOLD FROM SAND.
APPLICATION FILED APR. 11, 1919.
1,330,963.
Patented Feb. 17, 1920.
7 SHEETS—SHEET 1.
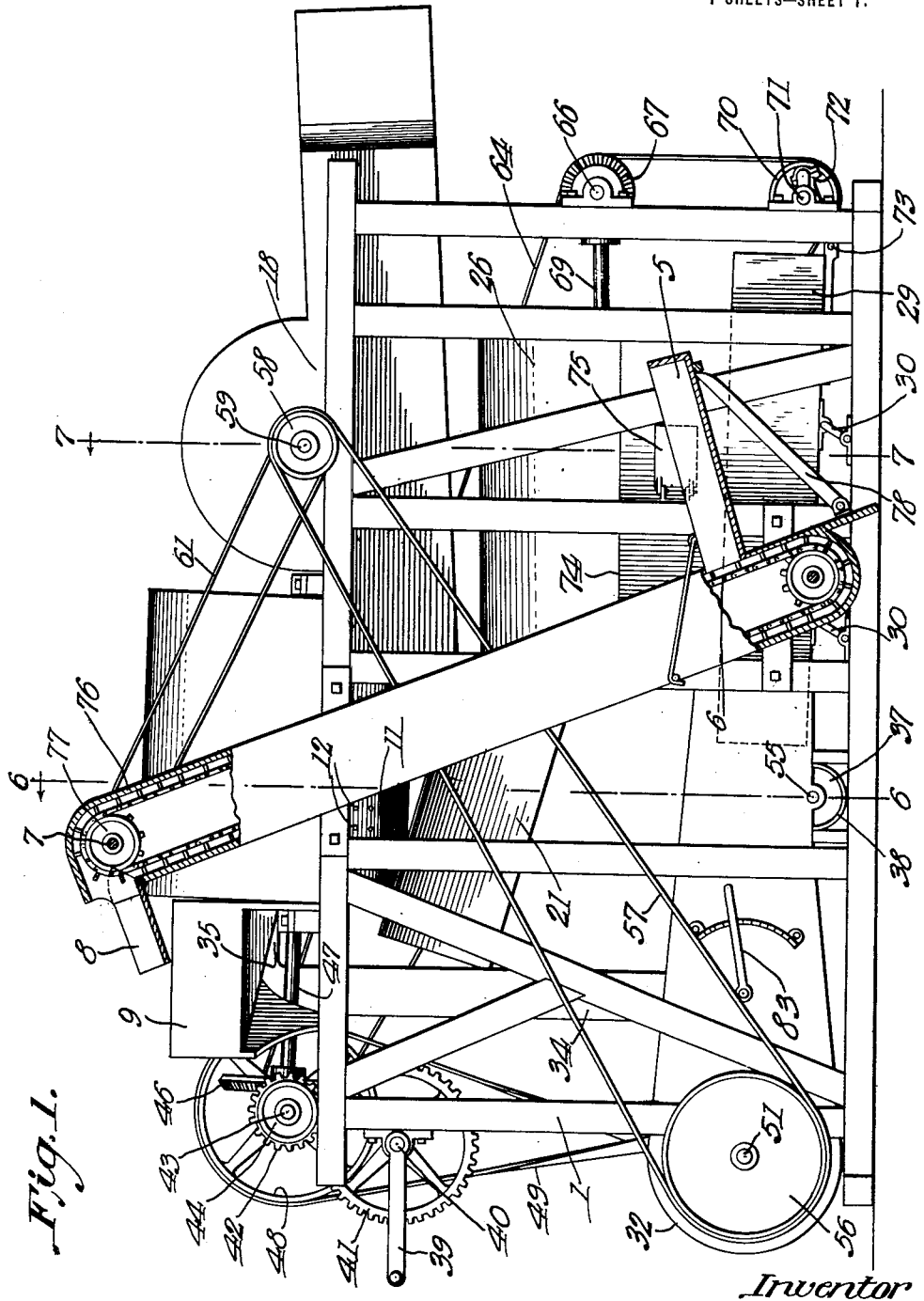

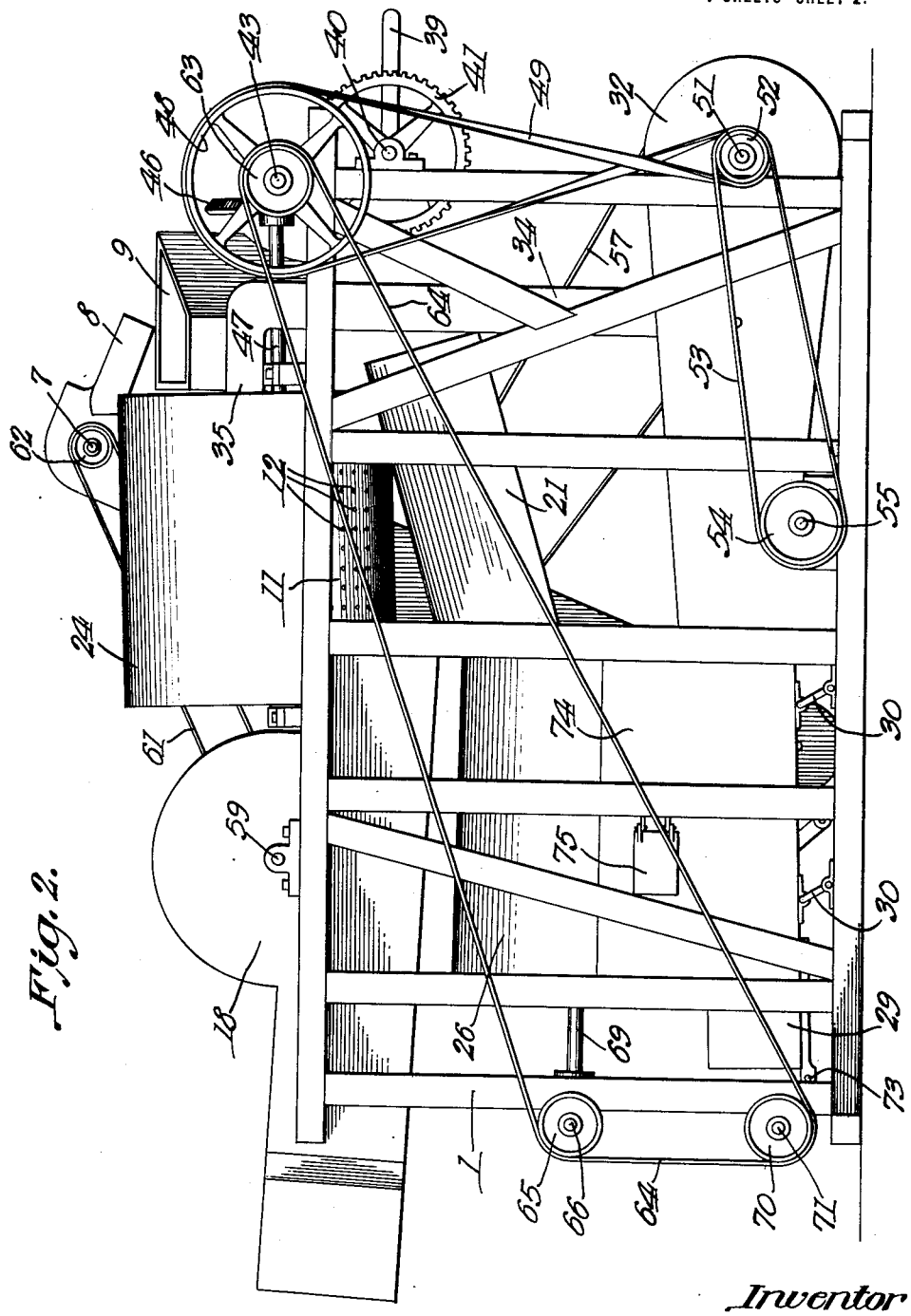

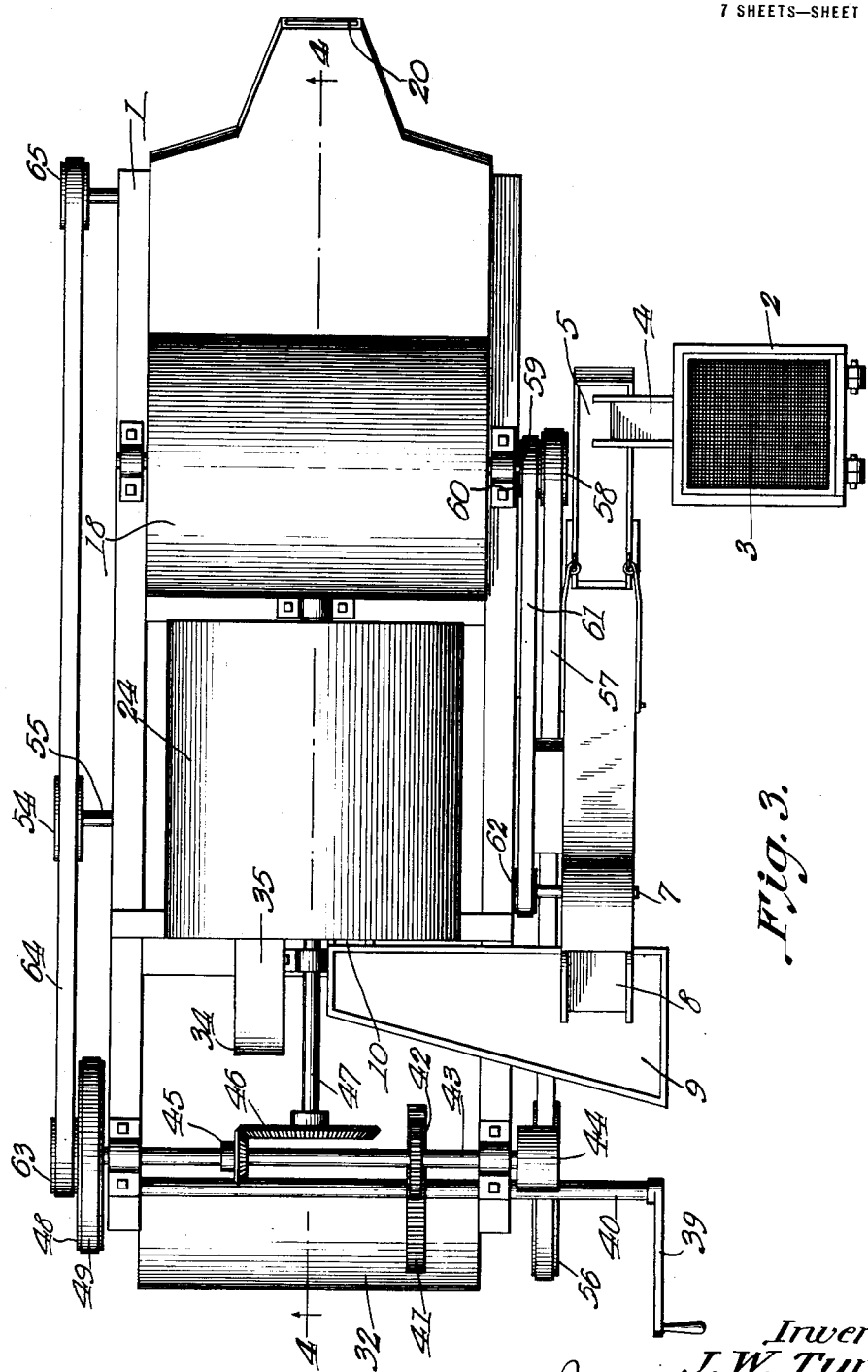

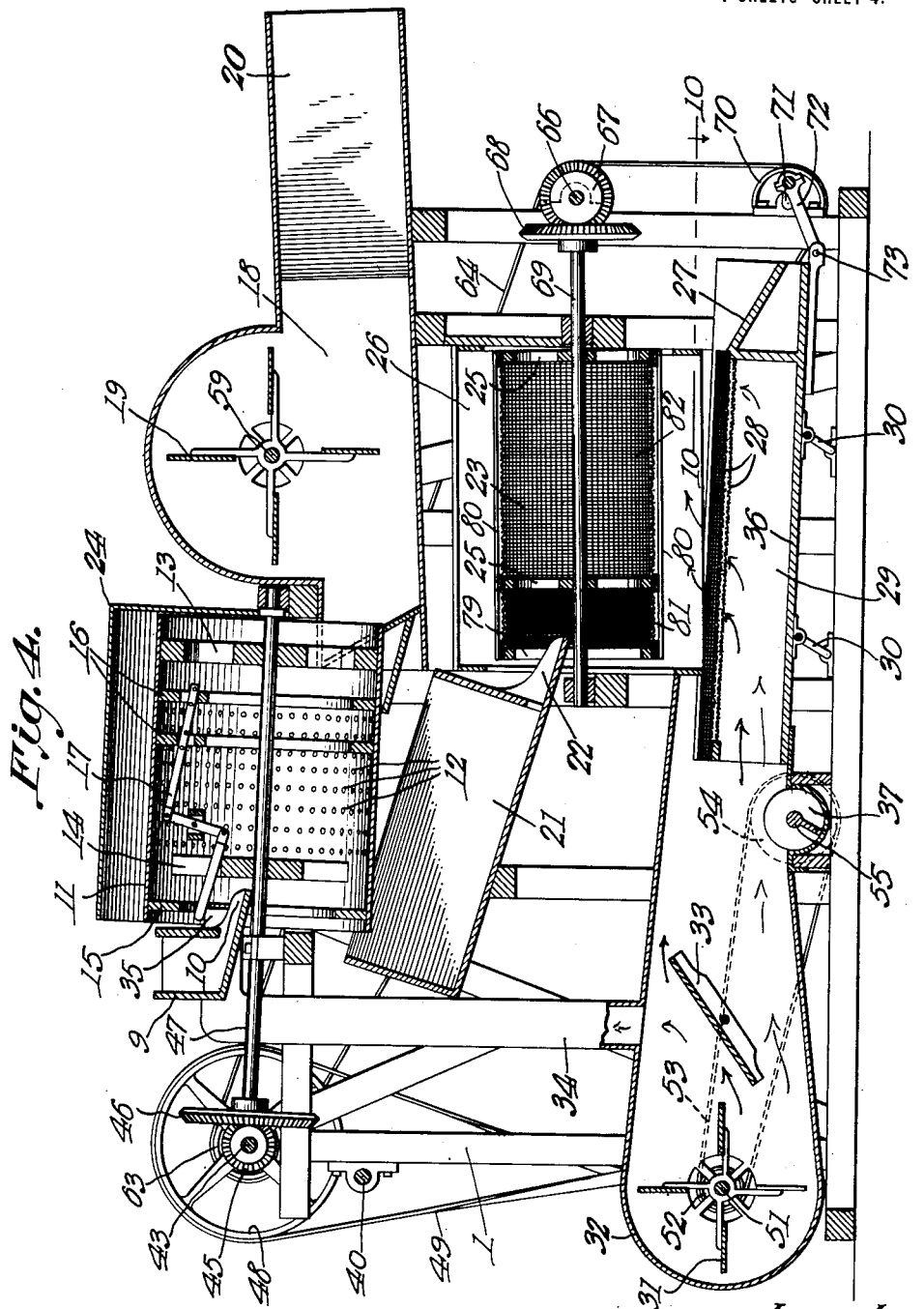

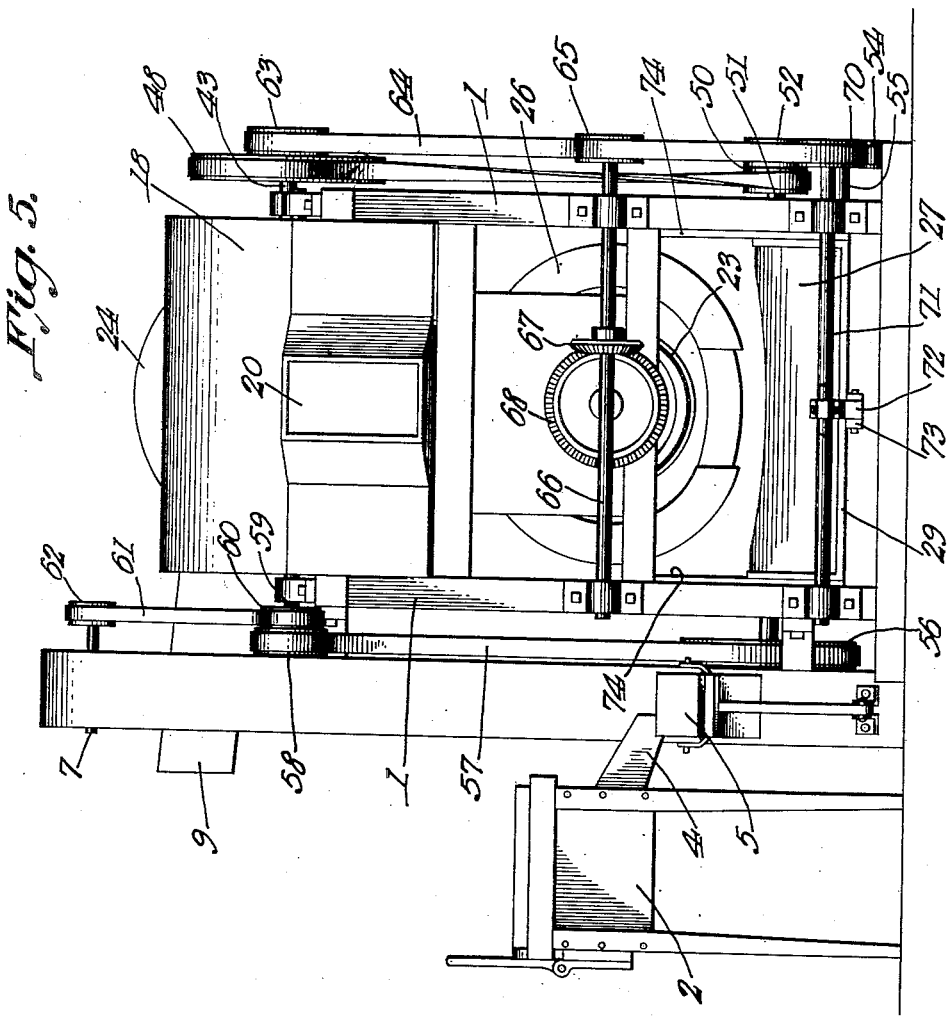

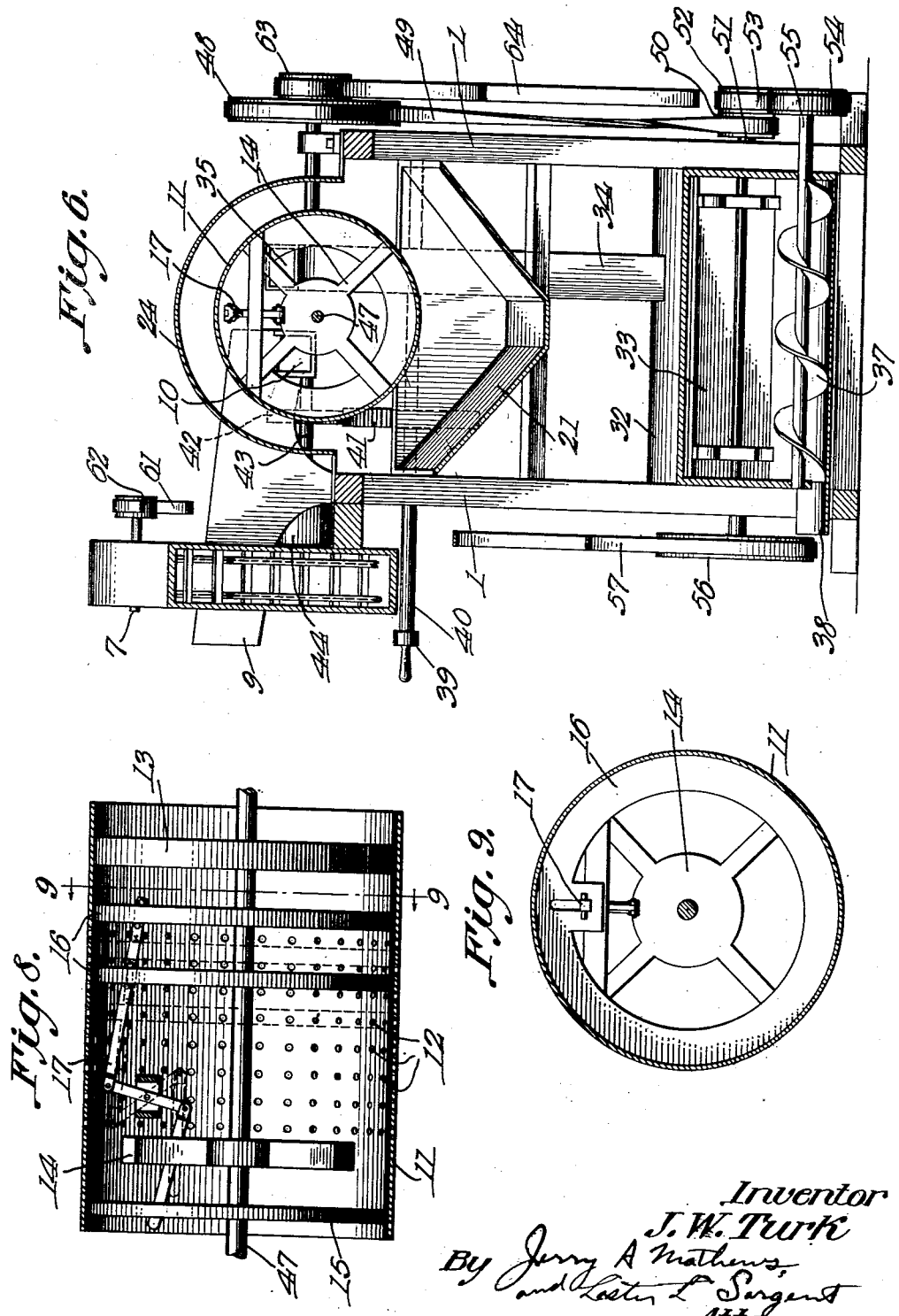

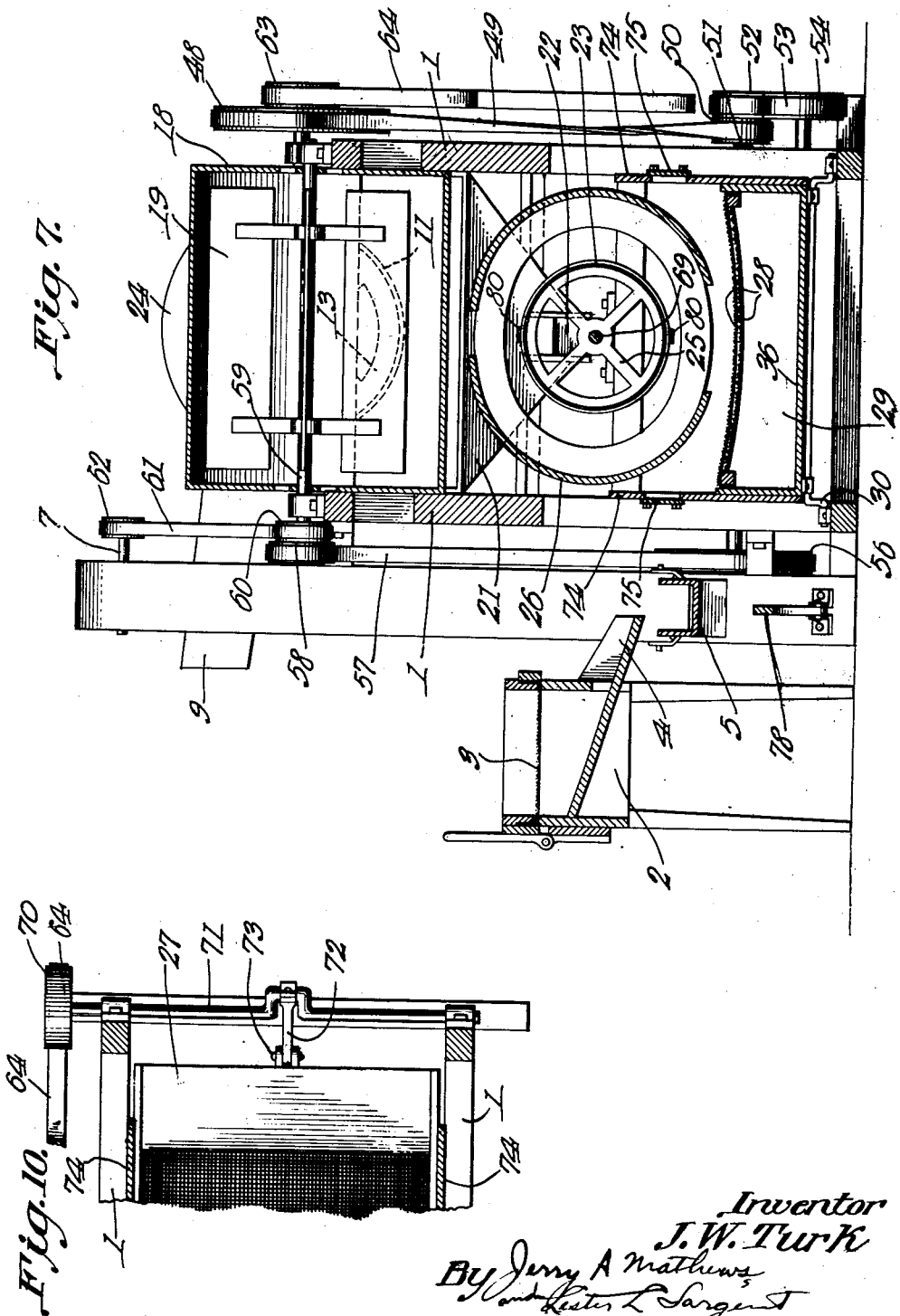

UNITED STATES PATENT OFFICE.

JAMES W. TURK, OF PORTLAND, OREGON.

MACHINE FOR SEPARATING GOLD FROM SAND.

1,330,963. Specification of Letters Patent. Patented Feb. 17, 1920.

Application filed April 11, 1919. Serial No. 289,433.

*To all whom it may concern:*

Be it known that I, JAMES W. TURK, a citizen of the United States, residing at Portland, in the county of Multnomah and State of Oregon, have invented a new and useful Machine for Separating Gold from Sand, of which the following is a specification.

The object of my invention is to provide an improved machine having a plurality of separating mechanisms arranged to most efficiently separate gold from sand and which will clean the gold with or without quicksilver. It is further my object to provide a machine the various mechanisms of which are operated from a single source of power and which may be actuated by any suitable means, and without the use of water.

I attain this and other objects of my invention by the mechanism set forth in the accompanying drawings, in which:

Figure 1 is a side elevation, partly in section on conveyer side;

Fig. 2 is a side elevation from reverse side;

Fig. 3 is a top plan;

Fig. 4 is a longitudinal vertical section on line 4—4 of Fig. 3;

Fig. 5 is an end elevation from discharge end;

Fig. 6 is a vertical transverse section on line 6—6 of Fig. 1;

Fig. 7 is a vertical transverse section on line 7—7 of Fig. 1;

Fig. 8 is a detailed sectional view, partly in elevation of metal cylinder 11;

Fig. 9 is a section on line 9—9 of Fig. 8;

Fig. 10 is a fragmentary sectional view on line 10—10 of Fig. 4.

Like numerals designate like parts throughout the several views:

Referring to the accompanying drawing, illustrating my invention, I provide a suitable frame work 1 to support the mechanism hereinafter described. The material or ore from which the gold is to be separated is first fed into the sifter 2, the finer material passing through screen 3 and down the slanting spout 4 of the sifter to the receiving trough 5 of the main machine. From trough 5 the ore empties into the buckets of the endless conveyer 6, which is operated by the usual chain and sprocket, as illustrated in Fig. 1. From endless conveyer 6 the material flows down a suitable trough 8, which is hooked to or may be made integral with the conveyer casing 76. The endless conveyer is driven by shaft 7, on which the sprocket 77 is mounted. I provide a hopper 9 which receives the ore from spout 8 and delivers it, through a suitable hopper spout 10, as shown in Fig. 4, to the rotatable drum 11. The spout 5 is hingedly mounted on conveyer casing 76 and is supported by a suitable brace 78, as shown in Fig. 1.

I provide a suitable drum 11 of metal and having perforations 12 around its median portion, as shown, or this portion of the drum may be made of suitable meshed screening. Drum 11 is rotatably supported by suitable spiders 13 and 14, such as illustrated in Fig. 4, mounted on shaft 47. Mounted within drum 11 I provide a plurality of suitable riffles 16 which catch the gold that is mingled with the ore fed into this drum. The finer material passes through the perforations 12 (of corresponding screened portions if a screened drum is employed) into a receiving trough 21. The larger material passes out of the lower open end of drum 11, which is mounted in a slightly inclined position, so that the material which does not pass through the perforations 12 will empty into a suitable fan casing 18. Fan casing 18 is provided with a suitable fan 19 mounted on shaft 59. The material is discharged by the force of the draft created by fan 19 through the exhaust opening 20.

As the drum 11 revolves the sand is shifted over the riffles, the sand working to the top and the gold to the bottom, where it either passes through the perforations 12 or is caught and retained by the riffles. I provide a suitable riffle shifting device or series of levers 17 attached to riffles 16 and which may be operated manually to sift the gold that has collected through the perforated or screened portion 12 of drum 11.

From trough 21 the material is emptied through spout 22 into the wire screened drum 23 which is mounted by means of suitable spiders 25 on shaft 69. Drum 23 is positioned in oppositely inclined relation to drum 11, for a more effective sifting of the material. Drum 23 is provided with a relatively fine screen 81 for the front end of the drum and a coarser screen 82 for the remaining portion of the drum, as shown in Fig. 4. Drum 23 is also provided with one or more riffles 79. Material too coarse to pass through the screen 81 will gradually work over the adjacent spider 25 to the coarser screen 82. Material too coarse to pass through the latter screen will overflow onto chute 27, and this material being sand is disposed of in any suitable way. The finer sand and gold which sifts through drum 23 is deposited on the vibrating screen 28, of which there are two. These screens 28 are very fine.

Referring to Figs. 1 and 4, I provide a shaker box 29, swingably supported on swinging shaker arms 30 suitably mounted on the main frame 1. I provide a fan 31, as shown in Fig. 4, mounted in a fan casing 32 which is shaped to direct a draft of air across screens 28, the blast of air being regulated by a suitable vane 33, which also functions to divert a current of air into the upright air chute 34, as shown in Fig. 4. Vane 33 is operated by a suitable handle 83.

Air chute 34 is provided with an outlet 35 positioned to direct a current of air into the first drum 11, as shown in Fig. 4.

Shaker box 29 is provided with a floor 36 which receives the gold dust that has passed through screen 28. The direction of the air currents created by fan 52 are indicated by arrows in Fig. 4. Adjacent to the end of shaker floor 36 I provide a suitable auger or spiral conveyer 37 for the fine gold dust shaking into it from floor 36, the material from member 37 being delivered through delivery spout 38, as shown in Fig. 6 to any suitable receptacle.

The various mechanisms above described are all operated from a single source of power, which may be either manual, or the apparatus may be driven by any suitable steam or gas engine. Referring to Fig. 3, the main driving shaft 40 is shown provided with a crank 39 such as would be used in manually operating the machine. Mounted on shaft 40, I provide a driving gear 41 meshing with gear 42, which is mounted on main driving shaft 43. At the end of shaft 43 I provide a pulley 44, which may be utilized when the apparatus is driven by a gas or steam engine. Any suitable method of driving by power may be utilized in place of manual operation. Also mounted on shaft 43 is a suitable bevel gear 45 meshing with bevel gear 46, which, as shown in Figs. 3 and 4, is mounted on shaft 47 which carries rotatable drum 11, and rotates that drum as heretofore described.

Mounted on shaft 43 I provide a suitable large driven pulley 48 which operates the belt 49 which in turn drives pulley 50, as shown in Fig. 7. Pulley 50 is mounted on shaft 51, which carries a second pulley 52, as shown in Figs. 2 and 6. Also mounted on pulley 50 is a belt 53 which drives pulley 54 and shaft 55, the latter shaft being the one driving the spiral conveyer, and shown in Figs. 4 and 6.

Referring to Fig. 1, I provide a pulley 56 mounted on the shaft 51. A belt 57 driven by pulley 56 in turn drives pulley 58 and shaft 59 on which pulley 58 is mounted, as shown in Fig. 1. Shaft 59 also carries a pulley 60 driving belt 61 by means of which pulley 62 and shaft 7 are operated, as shown in Fig. 3. The endless conveyer is driven by a sprocket 77 which is mounted on shaft 7 and driven by pulley 62.

Referring to Fig. 5 I provide a pulley 63 mounted on the main driving shaft 43, by means of which belt 64 and pulleys 65 and 70 are driven. Pulley 65 is mounted on shaft 66, as shown in Figs. 5 and 2, and on this shaft is also mounted a suitable bevel gear 67 which meshes with the bevel gear 68, which latter gear is mounted on shaft 47, as shown in Fig. 5 and which serves to drive the rotatable wire drum 23, as shown in Fig. 4. The function of pulley 70 which is driven by belt 64 is to drive the crank 71, connecting rod 72 and the shaker box 29 which is connected to rod 72 by pivot 73, and supported by swinging arm 30. Shaker box 29 is inclosed by side walls 74 as shown in Fig. 5. Side walls 74 are preferably provided with suitable clean-out doors 75, as shown in Figs. 2 and 7, for use if screen 28 becomes clogged.

Referring to Fig. 4 wire drum 23 comprises a section of moderately fine screen 82 and a section of finer screen 81. I provide a riffle at the end of screen 81 to catch the gold dust. Drum 23 is also provided with longitudinal ribs 80 as shown in Figs. 4 and 7.

Referring to Fig. 4 riffles 16 are slidably mounted in drum 11 so that they may be shifted in their position by means of the series of levers 17. These riffles are to hold the gold dust as the drum revolves, they are of somewhat less depth than the annular portion of spiders 13 and 15 which serve as end riffles.

By providing the two drums 11 and 23, each having riffles several siftings or separations of the gold and sand are effected as the gold passes from drum 11 through members 21 and 22 and thence through drum 23 to the shaker 29, except such larger material as is discharged through either member 20 from drum 11 or from member 27 coming from drum 23. A further sifting is effected by the fine screens 28 of shaker 29. The sand works to the top and the gold to the bottom in each of these sifting operations. The fan 31 furnishes currents of air to drum 11 through passage 34 and to the shaker screens 28 as indicated by arrows in Fig. 4. The air currents are regulated by the position of vane 33 which is operated by a suitable control lever 83 as shown in Fig. 1, the vane being pivotally mounted.

The material at the outset is fed into the machine by means of the endless conveyer from whence it passes first into the upper drum, thence into the inner wire drum, and thence to the shaker box, with the exception of such coarser material as is eliminated by the sifting and blasts from the air fans, the fine gold dust being delivered through the spiral conveyer 57 from shaker box 29 and finally delivered from the spiral conveyer clean.

As heretofore described in connection with the explanation of the structure all the mechanisms, both fans, rotating drums and shaker box are driven from a single source of power by operatively connected driving means.

What I claim is:

1. In a machine for separating gold from sand without the use of water, the combination of a plurality of concentrating drums, means for feeding material from one concentrating device to the next, means for forcing air currents through each of said concentrating devices for facilitating the removal of separated material, a plurality of adjustable riffles in the first of the series of concentrating devices, means for manually shifting said riffles, and means for the discharge of separated material into separated receptacles, substantially as shown.

2. In a machine of the class described, a perforated rotating drum having a plurality of movable riffles therein, means for manually moving the riffles, means for driving a current of air through said drum for effecting the removal of material passing over the riffles, and means driven from a single source of power for operating the aforesaid drum and air current producing means.

3. In a machine for separating gold from sand without the use of water, the combination of a rotating drum having perforations, movable riffles in the drum, means for feeding material to one end of the drum, a second rotating drum positioned directly below and disposed to receive material passing through the perforations in the first-mentioned drum, a plurality of air current operating means arranged to drive air currents through each of said rotating drums to separate material passing through the drums, means for receiving the separated material in different receptacles, and means operatively connected with a single source of power for simultaneously operating the aforesaid drums and air current operating means for the purpose of effecting the desired separation of material without the employment of water in the machine.

4. In a machine for separating gold from sand without the use of water, the combination of a plurality of concentrating drums having riffles spaced in said drums; means for feeding material passing through the upper of the plurality of drums to the one next below; means for disposing of material failing to pass through the drums by forced currents of air; a shaker box positioned below the lowermost of the concentrating drums, for further separating material which has passed through both drums; and means for driving the aforesaid plurality of concentrating drums, the aforesaid means for forcing currents of air through the drums, and the means for shaking the shaker box from a single source of power, whereby the various mechanisms are operated as a unit, substantially as described.

5. In combination with the apparatus described in claim 4, an endless conveyer in which the material from the shaker box is fed and by means of which it is discharged, said spiral conveyer also being driven from the single source of power, whereby it is operated as a unit with the other mechanisms set forth above.

6. In combination with the apparatus described in claim 4, means for adjustably regulating the current of air passing through the lowermost concentrating drum and shaker box without interrupting the operation of the apparatus as a unit.

JAMES W. TURK.